(12) United States Patent
Hochwarth et al.

(10) Patent No.: US 11,614,871 B2
(45) Date of Patent: Mar. 28, 2023

(54) SYSTEMS AND METHODS FOR FLEXIBLE WRITING OF INTERNAL DATA OF REGULATED SYSTEM

(71) Applicant: GE AVIATION SYSTEMS LLC, Grand Rapids, MI (US)

(72) Inventors: Joachim Karl Ulf Hochwarth, Caledonia, MI (US); Antonio Lugo Trejo, Querétaro (MX); Víctor Mario Leal Herrera, Querétaro (MX); Terrell Michael Brace, Ada, MI (US); Christian Reynolds Decker, Ada, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 513 days.

(21) Appl. No.: 16/574,550

(22) Filed: Sep. 18, 2019

(65) Prior Publication Data
US 2020/0097196 A1    Mar. 26, 2020

Related U.S. Application Data

(60) Provisional application No. 62/735,885, filed on Sep. 25, 2018.

(51) Int. Cl.
*G06F 3/06* (2006.01)
*G06F 21/60* (2013.01)
*G08G 5/00* (2006.01)

(52) U.S. Cl.
CPC .......... *G06F 3/0622* (2013.01); *G06F 3/0655* (2013.01); *G06F 3/0673* (2013.01); *G06F 21/604* (2013.01); *G08G 5/0021* (2013.01)

(58) Field of Classification Search
CPC .. G06F 12/1458; G06F 3/0622; G06F 13/126; G06F 21/604; G06F 3/0655; G06F 3/0673; G08G 5/0021
See application file for complete search history.

(56) References Cited

U.S. PATENT DOCUMENTS

2017/0019478 A1    1/2017  Russo et al.
2017/0242910 A1*   8/2017  Hochwarth ........ H04B 7/18506

OTHER PUBLICATIONS

EDN Testing aircraft AFDX systems https://www.edn.com/testing-aircraft-afdx-systems/ Apr. 26, 2012.*
"DNx-AFDX-664-User Manual" United Electronic Industries (May 2017) (Year: 2017).*
European Patent Office, Extended European Search Report re Application No. 19199267.6-1218, dated Feb. 18, 2020, 7 pages, Munich, Germany.

* cited by examiner

*Primary Examiner* — Henry Tsang
*Assistant Examiner* — Brian William Avery
(74) *Attorney, Agent, or Firm* — McGarry Bair PC

(57) ABSTRACT

A system and method for flexible writing of internal data of a regulated system can include generating a flexible write instruction, providing the flexible write instruction to the regulated system, and storing or committing data changes to the regulated system outside of the normal system operations, during runtime.

20 Claims, 3 Drawing Sheets

SYSTEMS AND METHODS FOR FLEXIBLE WRITING OF INTERNAL DATA OF REGULATED SYSTEM

CROSS REFERENCE TO RELATED APPLICATION(S)

This application claims priority to and benefit of U.S. Provisional Application No. 62/735,885 filed Sep. 25, 2018, which is incorporated herein in its entirety.

TECHNICAL FIELD

The disclosure relates to a method and apparatus for flexible writing of internal data, and specifically unauthorized data, to a data store of a regulated system.

BACKGROUND OF THE DISCLOSURE

Modern aircraft employ complex Flight Management Systems that handle and control large amounts of important data for the aircraft. Presently, in order to access (e.g. read or write) internal data of the Flight Management System, an interface that is defined at compile time in the software is required. However, due to certification requirements and safety concerns, changing or altering this access interface necessitates additional testing and recertification. As a result of the additional testing and recertification requirements, the access interface can be difficult and costly to change. Often these interfaces will have undergone many changes throughout the course of a development program, but are too costly to change once the system is in service.

BRIEF DESCRIPTION

In one aspect, the present disclosure relates to a system for runtime write access of data of a regulated system, including a data store having limited write access, an authorized writer communicatively connected with the data store and authorized to have write access to the data store by way of generating a runtime instruction communication delivered from the authorized writer to the data store, the runtime instruction communication defining authorized data to write to the data store, and a flexible writer that is not authorized to have write access to the data store, and adapted to receive an unauthorized data input, communicatively connected with the authorized writer. The flexible writer is configured to communicate instruction to the authorized writer to generate a runtime instruction communication, and replace the runtime instruction communication, during the delivery from the authorized writer to the data store, with the unauthorized data input such that the unauthorized data input is committed to the data store.

In another aspect, the present disclosure relates to a method of writing an unauthorized parameter to a write access limited data store of a runtime regulated system, the method including receiving the unauthorized parameter by a flexible writer function not authorized to write to the data store, instructing, by the flexible writer function, an authorized writer function to generate a runtime instruction communication authorized to write to the data store, replacing the runtime instruction communication during a delivery from the authorized writer function to the data store with a replacement communication including the unauthorized parameter, and executing the replacement communication and writing the unauthorized parameter to the data store.

In yet another aspect, the present disclosure relates to a system for updating a write access limited parameter in a runtime regulated avionics system by an unauthorized writer, the system including a data store having write access limited to a single authorized writer different from the unauthorized writer, the unauthorized writer having a request generator configured to generate an unauthorized write request including an updated parameter value, and communicatively connected with the regulated avionics system, and a flexible writer function of the regulated avionics system configured to receive the unauthorized write request and instruct the single authorized writer to generate a runtime instruction communication authorized to write to the data store, and configured to replace the runtime instruction communication generated by the single authorized writer with a modified runtime instruction communication including the updated parameter value, whereby the data store receives the modified runtime instruction communication and commits the updated parameter value to the data store.

DETAILED DESCRIPTION

Figure 1:
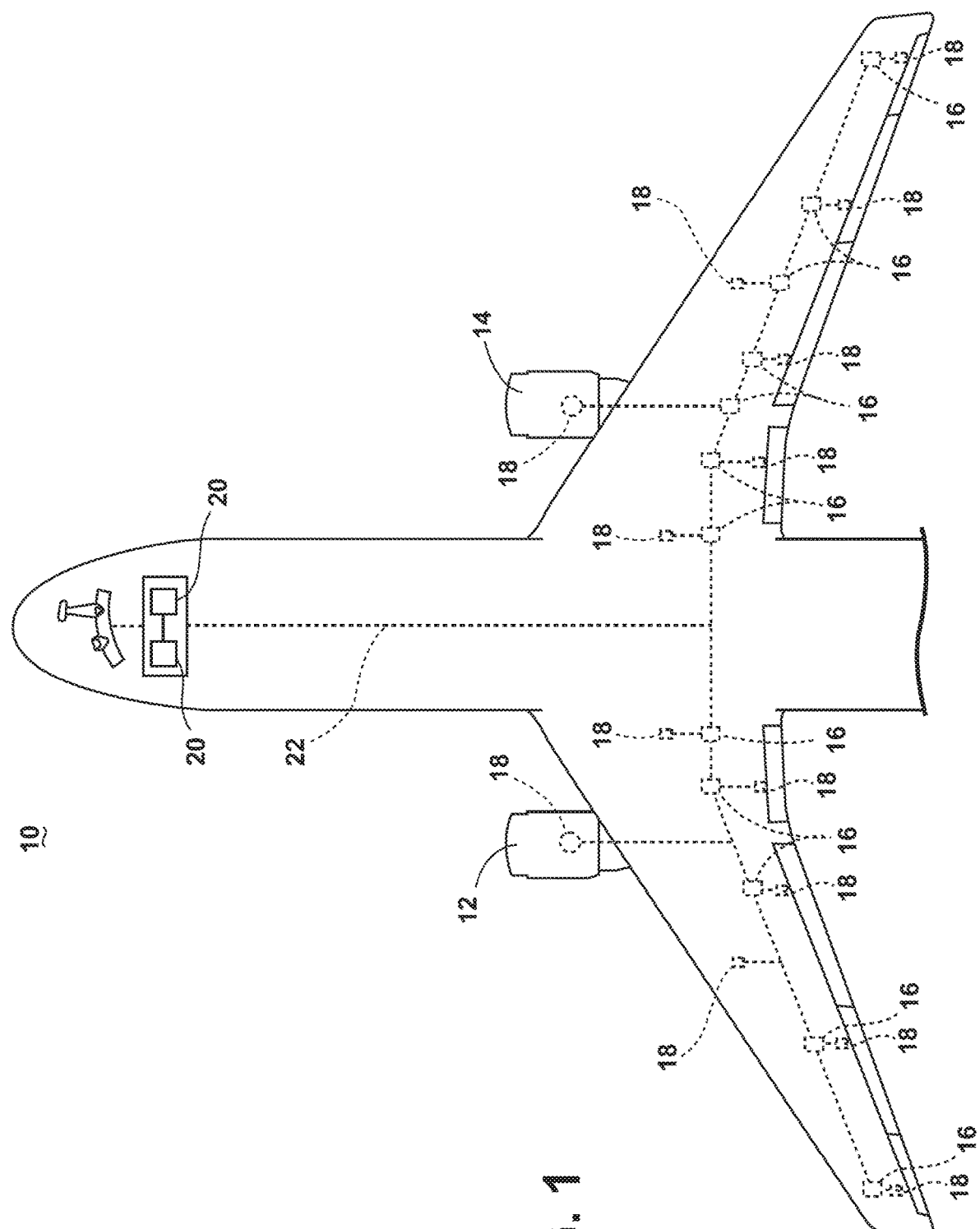
FIG. 1 illustrates a top-down schematic view of an aircraft, accordance with various aspects described herein.

Aspects of the disclosure can be implemented in any environment, apparatus, system, or method having a regulated, restricted, authorized, or otherwise limited "write-access" privileges to a memory or data store component. As used herein, "write-access" means availability or authorization to commit a change to a memory location, the change being storing or overwriting data, values, commands, instructions, or any other data, element, or identifier to a memory location, regardless of the function performed by the data, element, or identifier, or regardless of the function or implementation of the environment, apparatus, system, or method. Collectively, "access" to data or "accessing" data can refer to either reading, viewing, or otherwise receiving data from a data store, "writing" data, as referenced above, or a combination thereof. As used herein, a "regulated" system is a system having restrictions on access, such as write-access to data or values of the system, whereby only approved or authorized entities, parties, functions, or the like, are enabled or otherwise allowed to access the regulated or restricted elements. In one non-limiting example, only a single authorized function can have write access to a specific data element.

While "a set of" various elements will be described, it will be understood that "a set" can include any number of the respective elements, including only one element. Also as used herein, while elements or components can be described as "sensing" or "measuring" a respective value, data, function, or the like, sensing or measuring can include determining a value indicative of or related to the respective value, data, function, or the like, rather than directly sensing or measuring the value, data, function, or the like, itself. The sensed or measured value, data, function, or the like, can further be provided to additional components. For instance, the value can be provided to a controller module or processor, and the controller module or processor can perform processing on the value to determine a representative value or an electrical characteristic representative of said value, data, function, or the like.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching logic, or any other connectors configured to enable or disable the connection between respective elements or component.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a "data store" can include a data value stored in a memory, wherein the data value is only write-accessible by a single function, program, entity, or the like (a "writer"). The write-accessibility of the data store can be policed or otherwise regulated by digital security mechanisms understood by those skilled in the art. While only a single writer has write-access to the data store, a data store can have or include multiple function, program, or entities having read-access to read, view, or otherwise receive the data in an unidirectional relationship. In contrast with the data store, a "data store queue" can include a data value or set of data values stored in a memory, wherein the data value is write-accessible by a set of one or more functions, programs, entities, or the like. The write-accessibility of the data store queue can be policed or otherwise regulated by digital security mechanisms understood by those skilled in the art. Additionally, a data store queue can include only a single function, program, or entity having read-access to read, view, or otherwise receive the data in a unidirectional relationship. In non-limiting examples, this read operation can be "one-time" or destructive (e.g. removing the data after the access operation).

Reference now will be made in detail to aspects of the disclosure, one or more non-limiting examples of which are illustrated in the Figures. Each example is provided by way of explanation of the disclosure, not limitation of the disclosure. In fact, it will be apparent to those skilled in the art that various modifications and variations can be made in the present disclosure without departing from the scope or spirit of the disclosure. Thus, it is intended that the present disclosure covers such modifications and variations as come within the scope of the appended claims and their equivalents.

Example aspects of the present disclosure are directed to systems and methods that enable flexible access to internal data of a regulated system, such as an avionics system. Non-limiting examples of avionics systems can include, but are not limited to, a Flight Management System (FMS), an Airport Surface Map System (ASMS), or the like. In particular, an interface that is defined at compile time in the software is typically required to access internal data from the FMS. However, changing or altering the access interface necessitates source code modification, re-compilation which can increase cost, increase verification and increase testing burden. This is especially true when the internal data access is used in the testing of the software. Creating multiple versions of a compiled program can be very expensive and difficult to maintain. As a result of such additional testing and recertification requirements, the access interface can be difficult and costly to change. Accordingly, one advantage of the disclosed aspects is to provide a method and system that enables flexible write-access of internal data of a write-access regulated or limited system, such as an avionics system or an FMS.

Aspects of the present disclosure provide a technique to select, customize, or otherwise flexibly define data that is input or received by the avionics system during runtime. In particular, in some implementations, systems of the present disclosure can include a configuration tool that enables a system operator to make selections (e.g., via a user interface) of which data is thereafter input or received by or otherwise provided from the avionics system during runtime, for storing in, or writing to, memory.

Thus, aspects of the present disclosure provide a technique to customize or otherwise define data, values, parameters, or the like, to be received by and committed or written to memory in a data storage unit of a regulated system, such as an avionics system, during runtime. Furthermore, aspects of the present disclosure enable enhanced, flexible, and robust editing, modification, or updating of flight test data, testing, debugging, and analyzing of in-service problems. In yet another instance, aspects of the disclosure can provide for or enable an "open" or accessible interface to third-party applications running on either the embedded system or outside of it to interact with the system (e.g. an embedded Advanced Interval Management (A-IM) application or an application running on an Electronic Flight Bag (EFB)).

Although example aspects of the present disclosure are discussed with reference to avionics systems such as an FMS, the subject matter described herein can be used with or applied to provide flexible access to internal data of other systems, vehicles, machines, industrial or mechanical assets, or components without deviating from the scope of the present disclosure.

The exemplary drawings are for purposes of illustration only and the dimensions, positions, order and relative sizes reflected in the drawings attached hereto can vary.

Referring now to FIG. 1, an example aircraft 10 is shown having a fuselage and at least one turbine engine, shown as a left engine system 12 and a right engine system 14. The left and right engine systems 12, 14 may be substantially identical. While turbine engines 12, 14 are illustrated, the aircraft 10 may include fewer or additional engine systems, or alternative propulsion engine systems, such as propeller-based engines.

The aircraft 10 is shown further comprising a plurality of sensors, systems, and components, collectively referred to as Line-Replaceable Units (LRUs) 16, 18, and at least one server 20 or computing unit, shown as two flight management systems, or flight control computers, located proximate to each other, near the nose of the aircraft 10. At least one of the servers 20 may further include memory.

The LRUs 16, 18 and servers 20 may be communicatively interconnected by transmission or communication lines defining a data communications network 22, traversing at least a portion of the aircraft 10. Additional LRUs 16, 18 can be included. While a server 20 is described, aspects of the disclosure can include any computing system, flight computer, or display system displaying data from multiple systems.

The memory of the servers 20 can include Random Access Memory (RAM), flash memory, or one or more different types of portable electronic memory, etc., or any suitable combination of these types of memory. The LRUs 16, 18 or servers 20 may be operably coupled with the memory such that the LRUs 16, 18 or servers 20, or any computer programs or processes thereon, may access at least a portion of the memory (e.g. "shared memory").

The aircraft 10 shown in FIG. 1 is merely a schematic representation of one non-limiting example environment of the disclosure, and used to illustrate that a plurality of LRUs 16, 18 and servers 20 may be located throughout the aircraft 10. The exact location of the LRUs 16, 18 and servers 20 are not germane to the aspects of the disclosure. Additionally, more or fewer LRUs 16, 18 or servers 20 may be included in aspects of the disclosure.

The communications network 22 is illustrated schematically as a bus, but may include a number of data communication connectors and interfaces, for example, Ethernet or fiber optic cables, and routing or switching components, to facilitate the communicative interconnection between the LRUs 16, 18 and servers 20. Furthermore, the configuration and operation of the communications network 22 may be defined by a common set of standards or regulations applicable to particular aircraft environments. For example, the communications network 22 on an aircraft 10 may be defined by, or configured according to, the ARINC 664 (A664) standard, ARINC 429 (A429) standard, or ARINC 653 (A653) standard.

Figure 2:
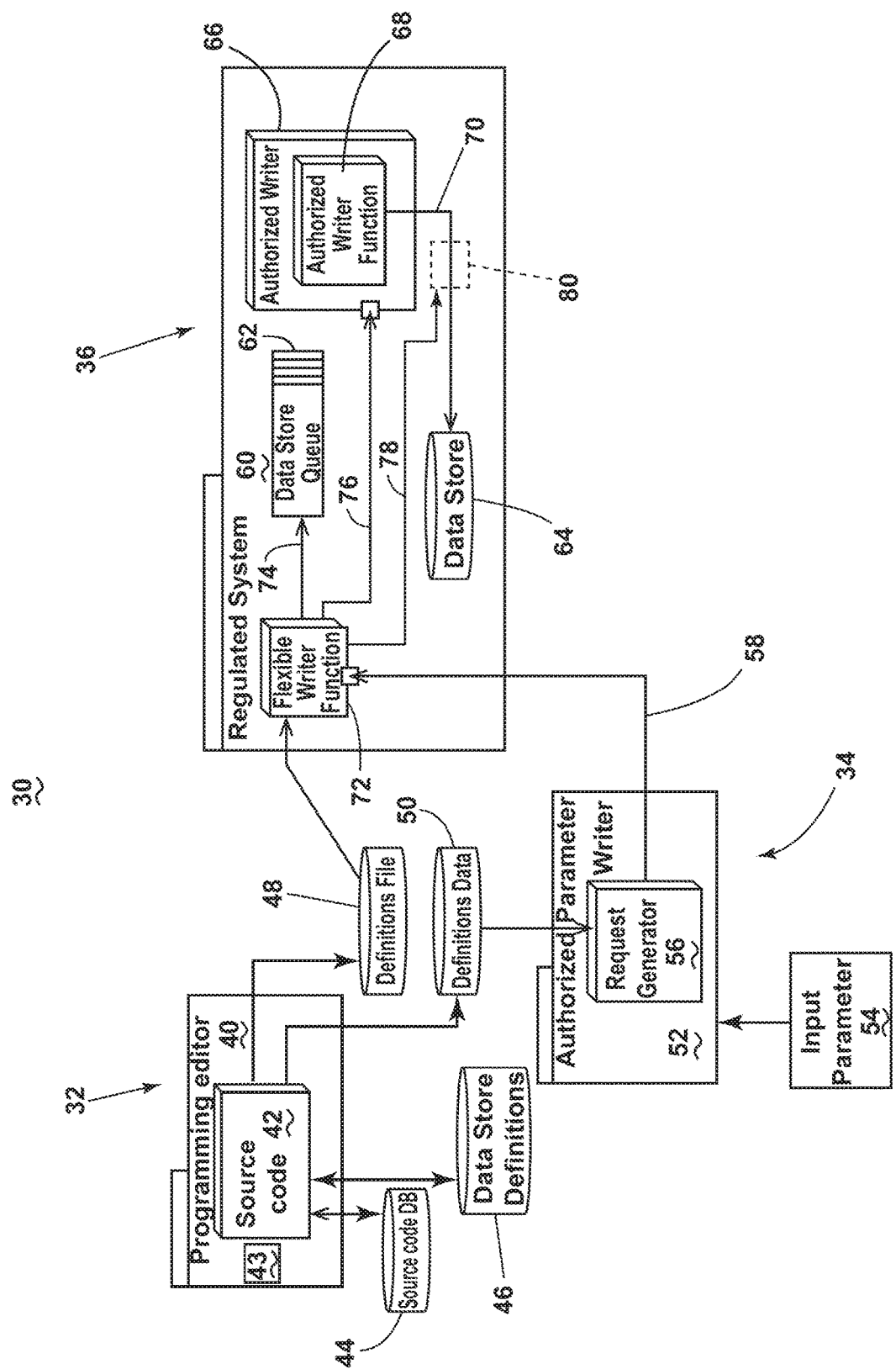
FIG. 2 illustrates an example schematic view of a system for flexible writing of internal data, in accordance with various aspects described herein.

FIG. 2 illustrates a system 30 for providing flexible write-access to internal data of a regulated system. As shown, the system 30 can include a set of environments that are schematically shown interacting with each other. The system 30 can include a programming environment 32 having a programming editor 40 interface for coding, editing, or otherwise developing source code 42 for a regulated system. Non-limiting examples of the programming environment 32 can include a first data storage (shown as the "source code database" 44) for storing source code elements, coding data, revision histories, or the like. The programming environment 32 can further include a second data storage for storing information related to the regulated system and utilized for operation of the regulated system. For example, the second data storage can include a set of regulated system data variable definitions, shown as "data store" or "data store queue" definition information 46. In one non-limiting example, the data store definition information can be developed by, or otherwise identified by a configuration tool function (hereafter, "configuration tool" 43).

The system 30 can also include a flexible writer environment 34 that can include an authorized parameter writer interface 52 adapted or configured to receive an input parameter 54 and generate a write request instruction from a request generator 56 for updating, writing, storing, or committing the input parameter 54 to storage in a regulated system. As used herein, "flexible" indicates that the respective components are user-accessible to introduce or inject specific actions (such as functional actions, including but not limited to write functions) in the system 30. In this sense, they are independent introduced actions not initiated by system 30, but may include implementation using system 30 functional elements.

The system 30 is further shown including one non-limiting example regulated system environment 36 including or defining a regulated system 60. In one non-limiting example, the regulated system 60 can include an FMS. The regulated system 60 can include a set of data store queues 62, a set of data stores 64, a flexible writer function 72, and an authorized writer 66, including an authorized writer function 68. As used herein, the "authorized" writer 66 or "authorized" writer function 68 is the representative single function, program, or entity having write-access for the representative data store 64 illustrated. In contrast with the authorized writer 66 or authorized writer function 68, the "flexible" writer function 72 is configured to spontaneously or independently (and outside of the normal operation or instruction of the regulated system 60) generate a write-access command to update data, values, or the like, in a respective data store queue 62 or data store 64, as described herein.

While the system 30 illustrates the programming environment 32, the flexible writer environment, and the regulated system environment 36 are illustrated proximate to each other, non-limiting aspects of the disclosure will be understood wherein temporal or physical spacing occurs between the respective environments 32, 34, 36. For example, the programming environment 32 is likely utilized well before the regulated system 60 is implemented in any further environment, such as the FMS of an aircraft. Similarly, the flexible writer environment 34 can include a mobile development component, such as mobile electronic device (a laptop, tablet, etc.) that can be transportable relative to the otherwise fixed regulated system 60 (e.g. that can be "fixed" relative to a particular aircraft). Additionally, it will be understood that each respective system 32, 34, 36 can include respective interfaces for utilizing the environment 32, 34, 36, including but not limited to user interfaces (e.g. graphical user interfaces, interactive devices such as mice), and connective interfaces (universal serial buses, Ethernet communication ports, or the like).

During programming activities (e.g. in the programming environment 32), the configuration tool 43 can include or be otherwise aware of prior knowledge of how data is maintained in the set of data stores 64, data store queues 62, the platform environment, the processor, or the like, of the developed regulated system 60. In response to development of the regulated system source code 42, the programming editor 40 or the configuration tool 43 can generate one or more loadable configuration files, shown as a definitions file 48 and a definitions data file 50. In some implementations, the configuration tool 43 or other system component can be configured or adapted to parse the regulated system source code 42 (or a derivative thereof) to provide a list of all available data store queues 62 or data stores 64. Collectively or individually, the definitions file 48 or the definitions data file 50 can instruct or otherwise inform a data-writing component of the avionics system regarding the identity of the data stores, data store queues, or a combination thereof For instance, in one non-limiting example, the definitions file 48 can contain a plain memory layout of the embedded system, whereas the definitions data file 50 can also contain data types and variable names to make it easier to define the input parameter 54. In non-limiting examples, the data-writing component can include the flexible writer environment 34, the authorized parameter writer interface 52, the request generator 56, the flexible writer function 72 or a subset thereof.

In some implementations, in addition to the regulated system source code 42, the configuration tool 43 can analyze or otherwise use one or more binary object files of the regulated system 60 to determine the memory layout of the system 60. For example, a compiler can optionally create a context clause (which also may be known as a representation specification). This context clause can contain tables describing the memory layout. The configuration tool 43 can use the context clause as an input in addition to the regulated system source code 42 (which can still be used to determine dependencies of nested data structures). Based on the target processor architecture (e.g., the processor which implements the regulated system 60), the configuration tool 43 is also aware of byte alignment and endianness to adjust offsets in the loadable configuration files 48, 50.

As shown, in some non-limiting aspects, the definitions data file 50 can include additional information for each identified data store, data store queue, or the like. The additional information can include, but is not limited to, offsets, size, parameters, or the like. In some implementations, the definitions file 48 or the definitions data file 50 can specify certain data groups (e.g. specific data stores 64 or specific data store queues 62) that can be written or overwritten during runtime of the regulated system 60.

In some implementations, in addition to specifying data store or data store queue definitions or data files, the loadable configuration files 48, 50 can also specify particular data entries (e.g., parameters) within specific data store queues 62 or data stores 64. The loadable configuration files 48, 50 can provide instructions (e.g., offsets, type, size, etc.) regarding how many bytes are to be written by a write-access command. For example, an offset can describe a number of bytes from the beginning of the data store 64 where a particular data item starts; a size can describe a number of bytes that a particular data item occupies; and a type can define how to interpret those bytes.

In particular, the loadable configuration files 48, 50 can further provide or enable the authorized parameter writer 52 or the flexible writer function 72 to decode or encode parameter data to be written to the data store queue 62 or data store 64. For example, encoded parameter data to be written to the data store queue 62 or data store 64 can be a set of serialized data (e.g., serialized bytes). The authorized parameter writer 52 or the flexible writer function 72 can encode the serialized data based on information contained in the loadable configuration files 48, 50.

During runtime, which can include runtime operation of the aircraft, or for example, testing or maintenance-based "runtime" of the regulated system 60, a user, function, system, or program can desire a change in parameter value of the data store queue 62 or the data store 64. Such a "flexible" change to parameter value can be enabled by way of the system 30 described herein.

For example, a user, function, system, or program can access the flexible writer environment 34 in order to generate a request to update or otherwise write or overwrite a specific parameter (or set of parameters), indicated by the input parameter 54. The response is generated by the request generator 56, as encoded or informed by the loadable configuration files 48, 50, and provided to the regulated system 60 or the flexible writer function 72 by way of communication 58.

If the requested parameter update is directed toward a parameter in the data store queue 62, the flexible writer function 72 can proceed to generate a write-accessible command (also encoded or informed by way of the loadable configuration files 48, 50) directly to the data store queue 62, by way of communication 74. This assumes the flexible writer function 72 is one of the multiple write-accessible writers of the data store queue 62. In another non-limiting example, the flexible writer function 72 can potentially supplement data coming via 58 with system-internal context data that may not be known to the outside entity (e.g. runtime-generated indices of events or context data coming from an aeronautical database).

If the requested parameter update is directed toward a parameter in the data store 64, the flexible writer function 72 cannot directly update the data store 64, as the flexible writer function 72 is the not the single writer has write-access to the data store (the single writer shown as the authorized writer 66). In this instance, the flexible writer function 72 can generate a command to the authorized writer 66 by way of communication 76. In response, the authorized writer 66 can instruct, or generate a write-accessible instruction, by way of the authorized writer function 68, shown as instruction communication 70. The flexible writer function 72 can further be configured or adapted to intercept the authorized instruction communication 70 with another communication 78 (shown schematically intercepting instruction communication 70 in box 80), and replace, inject, or otherwise update the authorized instruction communication 70 to include the requested parameter update of the data store 64. In one non-limiting example, the replacing, injecting, or otherwise updating the authorized instruction communication 70 can further be encoded or informed by way of the loadable configuration files 48, 50. The updated authorization instruction communication with the requested parameter update is then delivered to the data store 64, where the modified authorized write-access instruction is executed, or otherwise written to memory.

Figure 3:
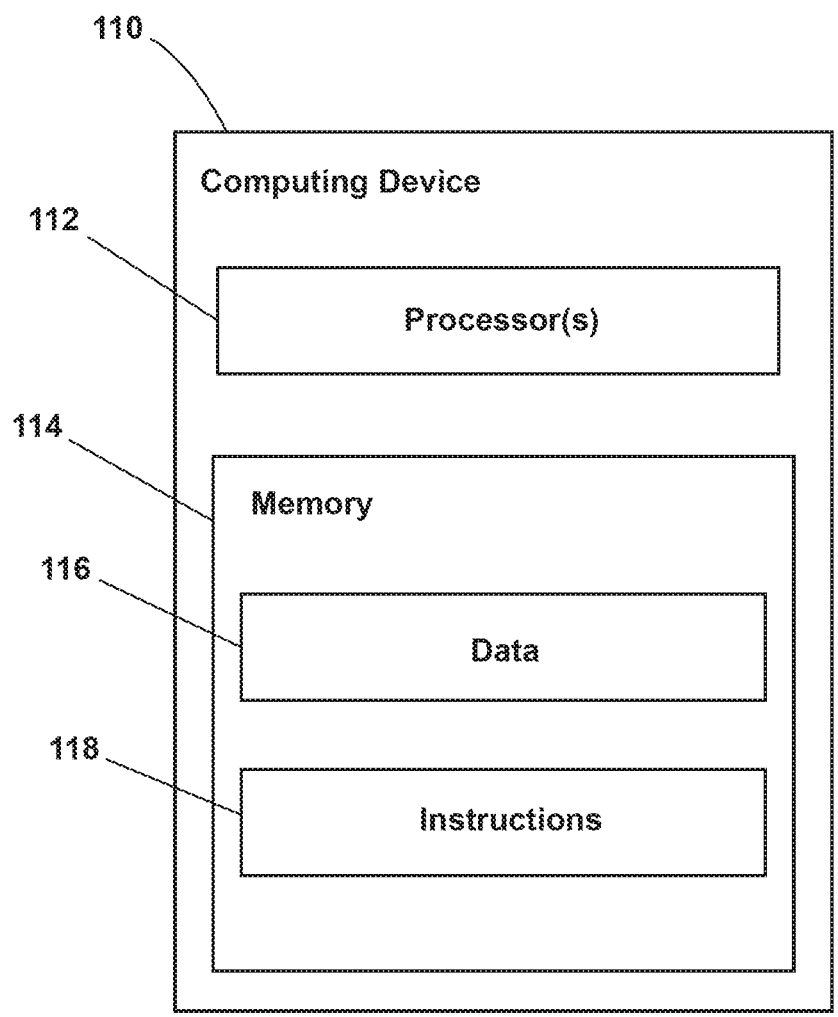
FIG. 3 illustrates an example schematic view of a computing device, in accordance with various aspects described herein.

Each of the configuration tool 43, the programming environment 32, the flexible writer environment 34, the flexible writer function 72, or the regulated system environment 60, or components thereof, can be implemented by one or more computing devices, schematically represented in FIG. 3. As shown, the computing device 110 can be referred to as a controller module or a microcontroller. The computing device 110 can be stand-alone or can be embedded into a computing system or environment 32, 34, 36. In another non-limiting example, the respective components, such as the flexible writer environment 34, can be located on or as a subcomponent of another vehicle or aircraft, or as an external tool.

The computing device 110 can include one or more processors 112 and a memory 114. The one or more processors 112 can be can be any suitable processing device, including, but not limited to, a processor core, a microprocessor, an Application Specific Integrated Circuit (ASIC), a Field Programmable Gate Array (FPGA), a controller, a microcontroller, a controller module, or the like. In another non-limiting example, the one or more processors 112 can include of processors or processor execution cores that are operatively connected. The memory 114 can include one or more non-transitory computer-readable storage mediums, such as RAM, ROM, EEPROM, EPROM, flash memory devices, magnetic disks, the like, or a combination thereof. The memory 114 can store data 116, such as data stores 64 or data store queues 62. The memory 114 can also store instructions 118 which are executed by the processor 112 to perform operations or functions described by the present disclosure.

It is readily apparent that an advantage of the present disclosure is that it enables truly configurable and dynamic write-access to the data without the need to recompile and recertify the aircraft system (e.g., Flight Management System).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

For example, when a data store queue 62 or data store 64 is written to, in accordance with the disclosure, there can also include a feedback mechanism for the writer (e.g. the authorized parameter writer 52, the flexible writer function 72, or a combination there of) to know that the writing was successful. This can occur, for example, during runtime for deterministic (automated) testing. In another non-limiting example, the feedback mechanism can include notification to or for the writer when the subscriber of the data store queue 62 has actually read the data or event change requested. In yet another non-limiting example, a bi-directional data store queue 62 can support external access (e.g. external to the regulated system 60, for instance) to read the data or event change requested to confirm the write has occurred.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A system for runtime write access of data of a regulated system, including a data store having limited write access, an authorized writer communicatively connected with the data store and authorized to have write access to the data store by way of generating a runtime instruction communication delivered from the authorized writer to the data store, the runtime instruction communication defining authorized data to write to the data store, and a flexible writer that is not authorized to have write access to the data store, and adapted to receive an unauthorized data input, communicatively connected with the authorized writer, and configured to communicate instruction to the authorized writer to generate a runtime instruction communication, and replace the runtime instruction communication, during the delivery from the authorized writer to the data store, with the unauthorized data input such that the unauthorized data input is committed to the data store.

2. The system of any preceding clause wherein the regulated system is an avionics system.

3. The system of any preceding clause wherein the avionics system is at least one of a flight management system or an airport surface map system.

4. The system of any preceding clause wherein the system is a testing system, a debugging system, or an analysis system.

5. The system of any preceding clause wherein the unauthorized data input includes flight test data for the regulated system.

6. The system of any preceding clause wherein the system is a programming development system.

7. The system of any preceding clause, further comprising a loadable configuration file defining write access instructions for the data store.

8. The system of any preceding clause wherein the flexible writer is further configured to receive the loadable configuration file and to form a replacement runtime instruction communication including the unauthorized data input in accordance with the write access instructions for the data store.

9. The system of any preceding clause wherein the flexible writer is further configured to form the replacement runtime instruction communication by encoding the data input in accordance with the write access instructions for the data store.

10. The system of any preceding clause wherein the unauthorized data input is a regulated system parameter, and the flexible writer is configured to overwrite the regulated system parameter by way of replacing the runtime instruction communication.

11. The system of any preceding clause wherein the regulated system is regulated by at least one of the ARINC 664 standard, the ARINC 429 standard, or the ARINC 653 standard.

12. A method of writing an unauthorized parameter to a write access limited data store of a runtime regulated system, the method including receiving the unauthorized parameter by a flexible writer function not authorized to write to the data store, instructing, by the flexible writer function, an authorized writer function to generate a runtime instruction communication authorized to write to the data store, replacing the runtime instruction communication during a delivery from the authorized writer function to the data store with a replacement communication including the unauthorized parameter, and executing the replacement communication and writing the unauthorized parameter to the data store.

13. The method of any preceding clause wherein the data store includes a predefined parameter memory access, and wherein replacing the runtime instruction communication includes encoding the unauthorized parameter in accordance with a data store configuration file informing write instructions of the predefined parameter memory access.

14. The method of any preceding clause wherein replacing the runtime instruction communication includes at least one of modifying the runtime instruction communication to include the unauthorized parameter, injecting the runtime instruction communication with the unauthorized parameter, or intercepting the runtime instruction communication.

15. The method of any preceding clause wherein executing the replacement communication includes executing the replacement communication based at least on an assumption that the replacement communication is an authorized communication.

16. The method of any preceding clause wherein the assumption that the replacement communication is an authorized communication based at least on the replacement communication appearing to originate from the authorized writer function.

17. A system for updating a write access limited parameter in a runtime regulated avionics system by an unauthorized writer, the system including a data store having write access limited to a single authorized writer different from the unauthorized writer, the unauthorized writer having a request generator configured to generate an unauthorized write request including an updated parameter value, and communicatively connected with the regulated avionics system, and a flexible writer function of the regulated avionics system configured to receive the unauthorized write request and instruct the single authorized writer to generate a runtime instruction communication authorized to write to the data store, and configured to replace the runtime instruction communication generated by the single authorized writer with a modified runtime instruction communication including the updated parameter value, whereby the data store receives the modified runtime instruction communication and commits the updated parameter value to the data store.

18. The system of any preceding clause wherein the system is a testing system, a debugging system, or an analysis system.

19. The system of any preceding clause wherein the updated parameter value includes flight test data for the regulated system.

20. The system of any preceding clause wherein the regulated system is regulated by at least one of the ARINC 664 standard, the ARINC 429 standard, or the ARINC 653 standard.

What is claimed is:

1. A system for runtime write access of data of a regulated system, comprising:
   a data store provided with the regulated system and only write-accessible by a single writer;
   an authorized writer communicatively connected with the data store and provided within the regulated system, the authorized writer being the single writer to have write access to the data store, the authorized writer being configured to generate a runtime instruction communication and send the runtime instruction communication to the data store, the runtime instruction communication defining authorized data to write to the data store; and
   a flexible writer provided within the regulated system and not having write access to the data store, the flexible writer being adapted to receive a data input from external the regulated system, the flexible writer being communicatively connected with the authorized writer, and configured to:
   command the authorized writer to generate the runtime instruction communication and send the runtime instruction communication to the data store;
   intercept the runtime instruction communication sent by the authorized writer; and
   modify the intercepted runtime instruction communication by replacing, injecting, or updating the intercepted runtime instruction communication, during the delivery from the authorized writer to the data store, with the data input;
   wherein the data store is configured to execute the intercepted and modified runtime instruction communication, whereby the data input is committed to the data store.

2. The system of claim 1 wherein the regulated system is an avionics system.

3. The system of claim 2 wherein the avionics system is at least one of a flight management system or an airport surface map system.

4. The system of claim 1 wherein the system is a testing system, a debugging system, or an analysis system.

5. The system of claim 4 wherein the data input includes flight test data for the regulated system.

6. The system of claim 1 wherein the system is a programming development system.

7. The system of claim 1, further comprising a loadable configuration file defining write access instructions for the data store.

8. The system of claim 7 wherein the flexible writer is further configured to receive the loadable configuration file and to form a replacement runtime instruction communication including the data input in accordance with the write access instructions for the data store.

9. The system of claim 8 wherein the flexible writer is further configured to form the replacement runtime instruction communication by encoding the data input in accordance with the write access instructions for the data store.

10. The system of claim 1 wherein the data input is a regulated system parameter, and the flexible writer is configured to overwrite the regulated system parameter by way of replacing the runtime instruction communication.

11. The system of claim 1 wherein the regulated system is regulated by at least one of an ARINC 664 standard, an ARINC 429 standard, or an ARINC 653 standard.

12. The system of claim 1, wherein the data store can include at least one data value stored in a memory with the data value being write-accessible only by the authorized writer.

13. A method of writing an unauthorized parameter to a write access limited data store of a runtime regulated system, wherein the write access limited data store is only write-accessible by an authorized writer function, the method comprising:
   receiving an unauthorized input parameter at a request generated provided exterior the runtime regulated system;
   receiving the unauthorized input parameter at a flexible writer function provided within the runtime regulated system, the flexible writer function being not authorized to write to the write access limited data store;
   instructing, by the flexible writer function, an authorized writer function to generate a runtime instruction communication that does not include the unauthorized input parameter, the authorized writer function being authorized to write to the write access limited data store;
   sending, by the authorized writer function, the runtime instruction communication;

intercepting, by the flexible writer function, the runtime instruction communication;

modifying, by the flexible writer function, the intercepted runtime instruction by replacing, injecting, or updating the intercepted runtime instruction communication during a delivery from the authorized writer function to the write access limited data store with a replacement communication including the unauthorized input parameter; and executing, by the write access limited data store, the modified runtime instruction communication including the unauthorized input parameter and writing the unauthorized parameter to the data store.

14. The method of claim 13 wherein the write access limited data store includes a predefined parameter memory access, and wherein replacing the runtime instruction communication includes encoding the unauthorized parameter in accordance with a data store configuration file informing write instructions of the predefined parameter memory access.

15. The method of claim 13 wherein replacing the runtime instruction communication includes at least one of modifying the runtime instruction communication to include the unauthorized parameter, injecting the runtime instruction communication with the unauthorized parameter, or intercepting the runtime instruction communication.

16. The method of claim 13 wherein executing the replacement communication includes executing the replacement communication based at least on an assumption that the replacement communication is an authorized communication.

17. The method of claim 16 wherein the assumption that the replacement communication is an authorized communication based at least on the replacement communication appearing to originate from the authorized writer function.

18. A system for updating a write access limited parameter in a runtime regulated avionics system by an environment exterior the runtime regulated avionics system and not having authorized write access to the runtime regulated avionics system, the system comprising:

a single authorized writer provided within the runtime regulated system;

the data store provided within the runtime regulated system and only being write-accessible by the single authorized writer;

a request generator provided in the environment exterior the runtime regulated avionics system, the request generator being configured to generate an unauthorized write request including an updated input parameter value, the request generator being communicatively connected with the regulated avionics system; and a flexible writer function provided within the runtime regulated avionics system, the flexible writer function being configured to:

receive the unauthorized write request including the updated input parameter from the request generator and instruct the single authorized writer to generate a runtime instruction communication authorized to write to the data store, within the runtime instruction communication not including the updated input parameter;

intercept the runtime instruction communication sent by the single authorized writer; and modify the intercepted runtime instruction communication by replacing, injecting, or updating the intercepted runtime instruction communication generated by the single authorized writer with a modified runtime instruction communication including the updated input parameter value, whereby the data store receives the modified runtime instruction communication and commits the updated input parameter value to the data store.

19. The system of claim 18 wherein the system is a testing system, a debugging system, or an analysis system.

20. The system of claim 18 wherein the runtime regulated avionics system is regulated by at least one of an ARINC 664 standard, an ARINC 429 standard, or an ARINC 653 standard.

* * * * *